United States Patent
Baskaran et al.

(10) Patent No.: US 11,078,806 B2
(45) Date of Patent: Aug. 3, 2021

(54) APPARATUS AND METHODS FOR CLEANING INTERNAL CAVITIES OF BLADES

(71) Applicant: UNITED TECHNOLOGIES CORPORATION, Farmington, CT (US)

(72) Inventors: Karthikeyan Baskaran, Singapore (SG); Garimella Balaji Rao, Singapore (SG)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/217,751

(22) Filed: Dec. 12, 2018

(65) Prior Publication Data

US 2020/0191013 A1 Jun. 18, 2020

(51) Int. Cl.
*F01D 25/00* (2006.01)
*B08B 7/02* (2006.01)
*B08B 9/00* (2006.01)

(52) U.S. Cl.
CPC .............. *F01D 25/002* (2013.01); *B08B 7/02* (2013.01); *B08B 9/00* (2013.01); *F05D 2240/301* (2013.01)

(58) Field of Classification Search
None
See application file for complete search history.

(56) References Cited

U.S. PATENT DOCUMENTS

| 4,381,577 | A | * | 5/1983 | Boye | B08B 7/02 15/304 |
|---|---|---|---|---|---|
| 6,759,627 | B2 | | 7/2004 | Kilburn | |
| 6,883,527 | B2 | * | 4/2005 | Travaly | B08B 9/00 134/169 R |
| 2010/0219642 | A1 | * | 9/2010 | Kim | F03D 80/70 290/55 |
| 2011/0180109 | A1 | | 7/2011 | Stillman et al. | |
| 2015/0239021 | A1 | * | 8/2015 | Ponomarev | B08B 5/04 134/1 |
| 2016/0228929 | A1 | | 8/2016 | Williamson et al. | |

FOREIGN PATENT DOCUMENTS

| DE | 102015209347 | 11/2016 |
|---|---|---|
| EP | 3167966 | 5/2017 |
| EP | 3357591 | 8/2018 |
| FR | 2979263 | 3/2013 |
| WO | 2015126628 | 8/2015 |

OTHER PUBLICATIONS

European Patent Office, European Search Report dated May 11, 2020 in Application No. 19215790.7.

* cited by examiner

*Primary Examiner* — Eric W Golightly
(74) *Attorney, Agent, or Firm* — Snell & Wilmer L.L.P.

(57) ABSTRACT

An apparatus for dislodging material within an airfoil element is disclosed. In various embodiments, the apparatus includes a robotic arm configured for multi-axis movement of a mounting head with respect to the airfoil element; a vibration mechanism connected to the mounting head; and a tip member connected to the vibration mechanism and configured for vibratory contact with a surface of the airfoil element.

11 Claims, 9 Drawing Sheets

APPARATUS AND METHODS FOR CLEANING INTERNAL CAVITIES OF BLADES

FIELD

The present disclosure relates generally to gas turbine engines and, more particularly, to apparatus and methods used to repair and restore airfoil elements used in gas turbine engines.

BACKGROUND

Gas turbine engines, such as those used to power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections. Such gas turbine engines, including, more broadly speaking, industrial gas turbine engines, are subject to periodic servicing, requiring the removal, cleaning, inspection and repair or restoration of various individual components, particularly the airfoil elements of the turbine sections of such engines (e.g., the rotor blades and the stator vanes of the high and low pressure turbine sections).

The rotor blades and stator vanes of turbine sections are typically formed of high temperature alloys, including, for example, nickel-based superalloys. These airfoil elements may include internal cooling passage systems that comprise internal passageways extending from inlets to outlets. The inlets are typically positioned along the root sections of the rotor blades or along either an inner diameter platform or an outer diameter shroud of the stator vanes. The outlets are typically positioned on various surface sections of the airfoil element, including the leading and trailing edge surfaces and the pressure and suction side surfaces.

While in service, wear, damage, fouling and the like may occur over time. For example, various sections of the internal cooling passage systems, including the inlets, the outlets and the passageways extending therebetween may become plugged or accumulate material that may foul or obstruct these portions of the passageway systems. Wear and damage may also be present to the substrate and to the various coatings upon the substrate that comprise the structure and surface of the airfoil elements.

Periodic servicing may include removal of the airfoil elements from the corresponding disks, platforms or shrouds and subjecting the airfoil elements to various cleaning steps, such as, for example, autoclave cleaning, high pressure fluid flushing and ultrasonic cleaning. The various cleaning steps can be time consuming and costly, however, especially in cases where the various passageways extending through the airfoil elements have become clogged or otherwise obstructed with accumulated material or debris. Methods and apparatus to more effectively dislodge and remove such accumulated material or debris may reduce the associated time and cost required in periodic servicing of airfoil elements such as rotor blades and stator vanes.

SUMMARY

An apparatus for dislodging material within an airfoil element is disclosed. In various embodiments, the apparatus includes a robotic arm configured for multi-axis movement of a mounting head with respect to the airfoil element; a vibration mechanism connected to the mounting head; and a tip member connected to the vibration mechanism and configured for vibratory contact with a surface of the airfoil element.

In various embodiments, the vibration mechanism is connected to a bias element configured to maintain the tip member against the surface of the airfoil element. In various embodiments, the bias element is a pneumatic cylinder. In various embodiments, the pneumatic cylinder includes a rod connected to the mounting head and is configured to translate the tip member in an axial direction with respect to the rod. In various embodiments, the pneumatic cylinder is connected by a pneumatic supply line to a sub-atmospheric pressure source.

In various embodiments, the vibration mechanism is an air scribe or an air hammer. In various embodiments, the vibration mechanism is configured to vibrate the tip member within a range of about ten-thousand cycles per minute to about fifteen-thousand cycles per minute. In various embodiments, the tip member is connected to the vibration mechanism by a coupler.

In various embodiments, the apparatus further includes a vice configured to grasp the airfoil element. In various embodiments, a backstop member is configured to support a portion of the airfoil element.

In various embodiments, the robotic arm is configured to translate the tip member against the surface of the airfoil element in a spanwise direction and in a chordwise direction. In various embodiments, the vibration mechanism is configured to vibrate the tip member in a range of about ten-thousand cycles per minute to about fifteen-thousand cycles per minute. In various embodiments, the tip member is constructed of a plastic material and includes a contact portion configured for contacting the surface of the airfoil element and a chuck portion configured for positioning within a coupler.

An apparatus for dislodging material within an internal cooling passage system of a turbine blade is disclosed. In various embodiments, the apparatus includes a robotic arm configured for multi-axis movement with respect to the turbine blade; a vibration mechanism connected to the robotic arm; and a tip member connected to the vibration mechanism and configured for vibratory contact with a surface of the turbine blade.

In various embodiments, the vibration mechanism is connected to a pneumatic cylinder configured to maintain the tip member against the surface of the turbine blade. In various embodiments, the pneumatic cylinder includes a rod connected to the robotic arm and is configured to translate the tip member in an axial direction with respect to the rod. In various embodiments, the pneumatic cylinder is connected by a pneumatic supply line to a sub-atmospheric pressure source. In various embodiments, the vibration mechanism is configured to vibrate the tip member in a range of about ten-thousand cycles per minute to about fifteen-thousand cycles per minute.

A method for dislodging material within an internal cooling passage system of an airfoil element is disclosed. In various embodiments, the method includes the steps of positioning a robotic arm configured for multi-axis movement of a vibration mechanism adjacent a surface of the airfoil element; translating a tip member connected to the vibration mechanism over the surface of the airfoil element; and vibrating the tip member against the surface of the airfoil element.

In various embodiments, the step of translating the tip member connected to the vibration mechanism over the surface of the airfoil element comprises moving the tip member in a spanwise direction and in a chordwise direction and the step of vibrating the tip member against the surface of the airfoil element comprises vibrating the tip member within a range of about ten-thousand cycles per minute to about fifteen-thousand cycles per minute.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
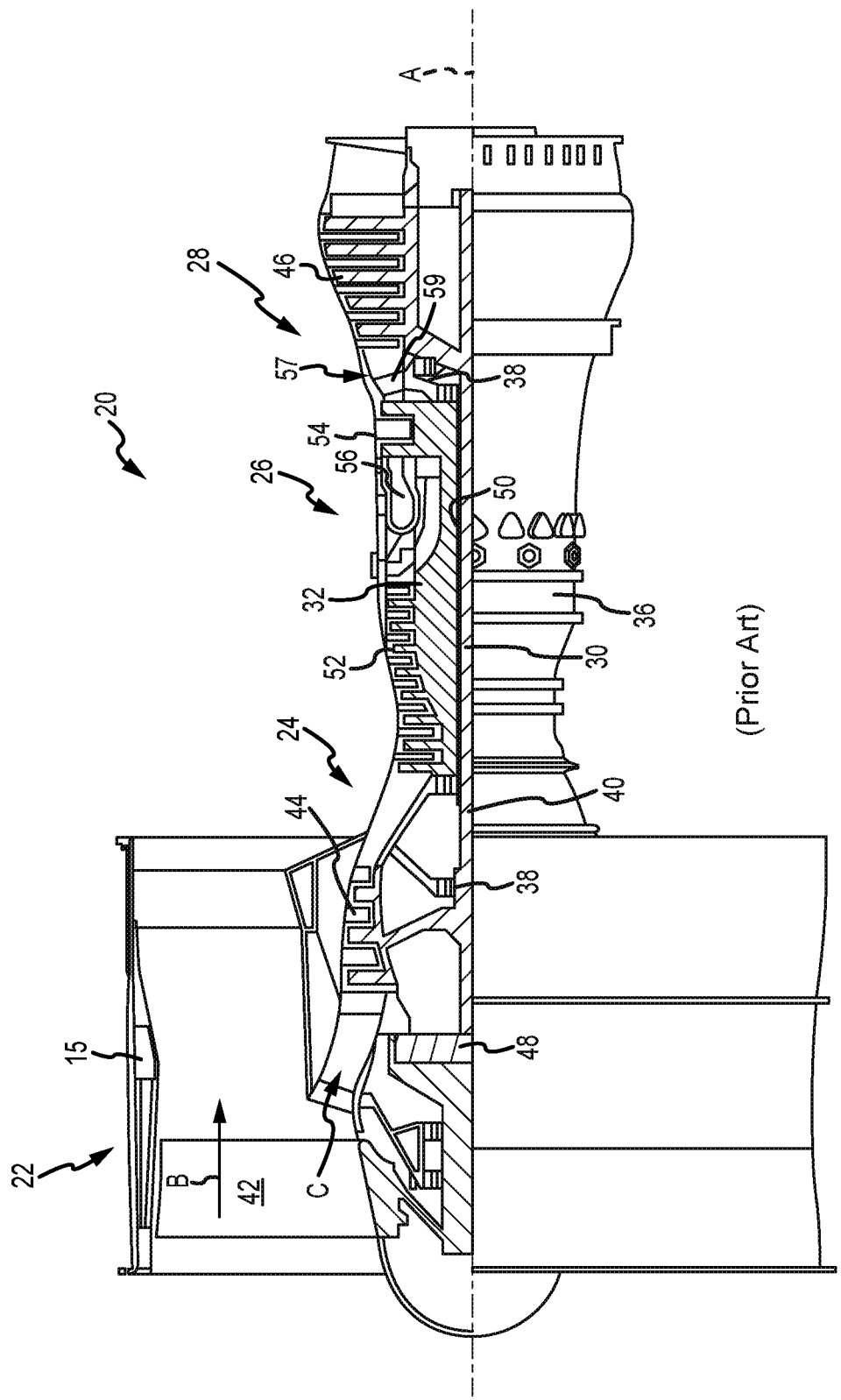
FIG. 1A is a schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
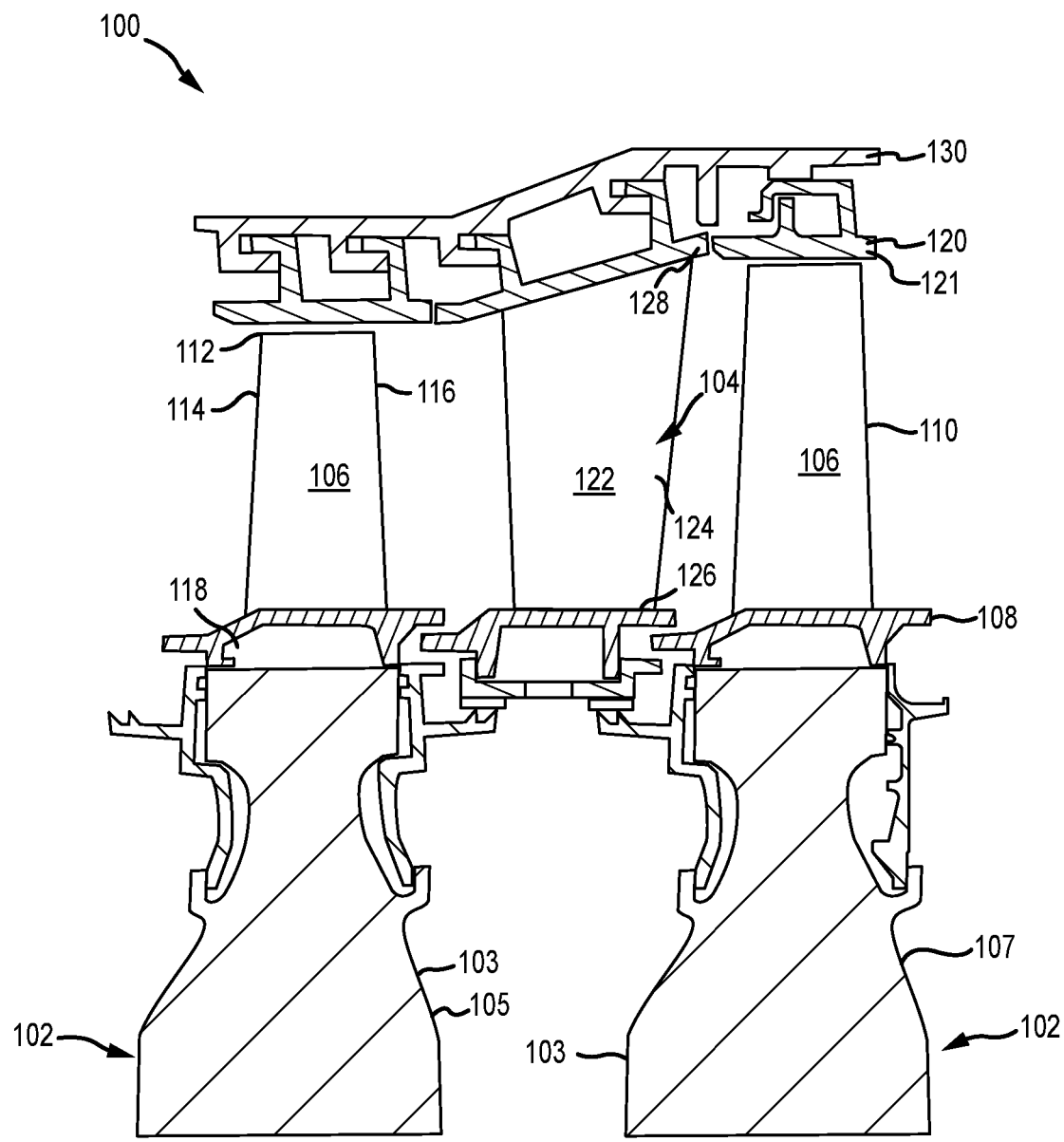
FIG. 1B is a schematic side view of a rotor and vane assembly of a turbine section of a gas turbine engine, in accordance with various embodiments.

Referring now to FIG. 1B, selected portions of a turbine section 100 of a gas turbine engine, such as, for example, the high pressure turbine 54 within the turbine section 28 described above with reference to FIG. 1A, are illustrated.

The turbine section 100 includes alternating rows of rotor assemblies 102 and stator assemblies 104. Each of the rotor assemblies 102 carries one or more rotor blades 106 for rotation about a central longitudinal axis A. Each of the rotor blades 106 includes a rotor platform 108 and an airfoil 110 extending in a radial direction R from the rotor platform 108 to a rotor tip 112. The airfoil 110 generally extends in a chord-wise direction X between a leading edge 114 and a trailing edge 116. A root section 118 of each of the rotor blades 106 is mounted to a rotor disk 103, which may be either an upstream rotor disk 105 or a downstream rotor disk 107. A blade outer air seal (BOAS) 120 is disposed radially outward of the rotor tip 112 of the airfoil 110. The BOAS 120 includes a platform 121 that provides a seal to prevent hot gases from leaking outside the core airflow path C (see FIG. 1A).

Each of the stator assemblies 104 includes one or more vanes 122 positioned along the central longitudinal axis A and adjacent to one or more rotor blades 106. Each of the vanes 122 includes an airfoil 124 extending between an inner vane platform 126 and an outer vane platform 128 (or shroud). The stator assemblies 104 are connected to an engine casing structure 130. The BOAS 120 and the stator assemblies 104 may be disposed radially inward of the engine casing structure 130. In various embodiments, one or both of the BOAS 120 and the stator assemblies 104 may include full annular platforms or they may be segmented and include feather seals between segments to help prevent leakage of cooling fluid between the segments. In various embodiments, one or more of the vanes 122 may be configured to rotate about an axis extending between the inner vane platform 126 and the outer vane platform 128.

Figure 2:
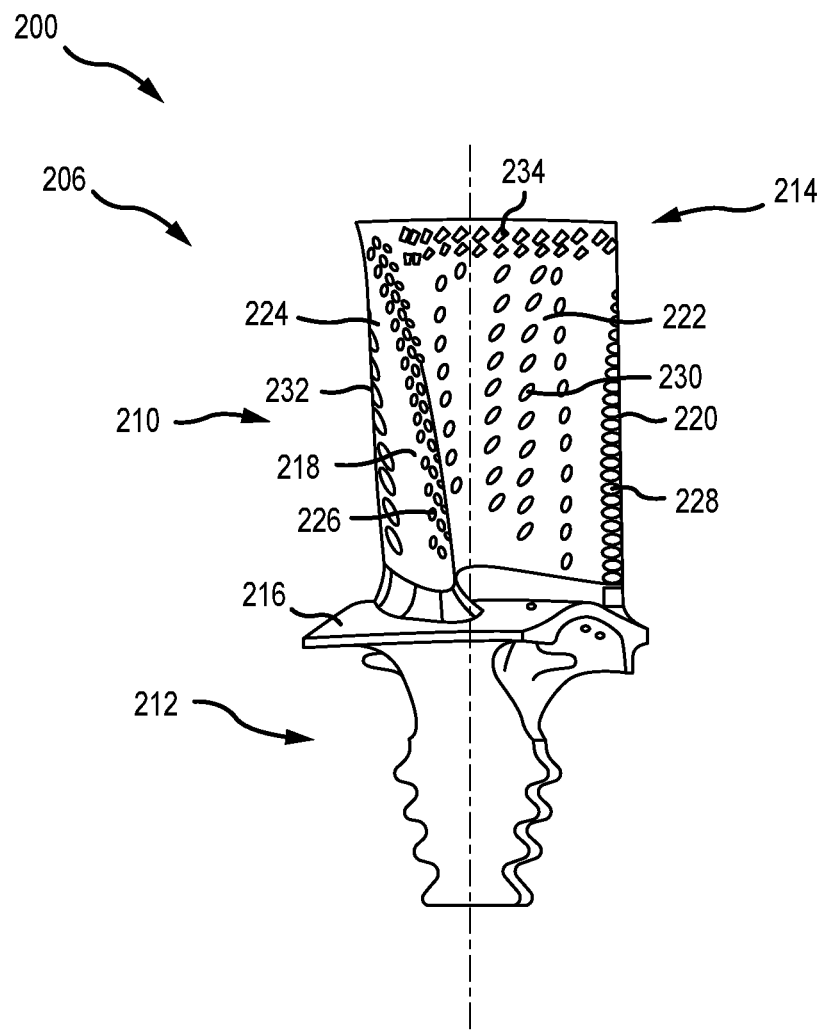
FIG. 2 is a side view of an airfoil element subject to periodic servicing, in accordance with various embodiments.

Referring now to FIG. 2, an airfoil element 200 is illustrated schematically in the form of a rotor blade 206 from a turbine section, such as, for example, one of the one or more rotor blades 106 described above with reference to FIG. 1B. In various embodiments, the rotor blade 206 includes an airfoil section 210, a root section 212 (e.g., a firtree root) and a blade tip 214. A platform 216 may be disposed between the airfoil section 210 and the root section 212. The airfoil section 210 typically extends in a spanwise direction between the platform 216 and the blade tip 214 and in a chordwise direction between a leading edge 218 and a trailing edge 220. Further, the airfoil section 210 typically defines a pressure side surface 222 and a suction side surface 224. In various embodiments, the rotor blade 206 includes an internal cooling passage system (see also FIGS. 3A and 3B), that includes a plurality of leading edge outlets 226, a plurality of trailing edge outlets 228, a plurality of pressure side surface outlets 230, a plurality of suction side surface outlets 232 and a plurality of blade tip outlets 234. As described below, the various pluralities of outlets provide openings for a cooling fluid circulating through various internal passageways within the rotor blade 206 to exit.

Figure 3A:
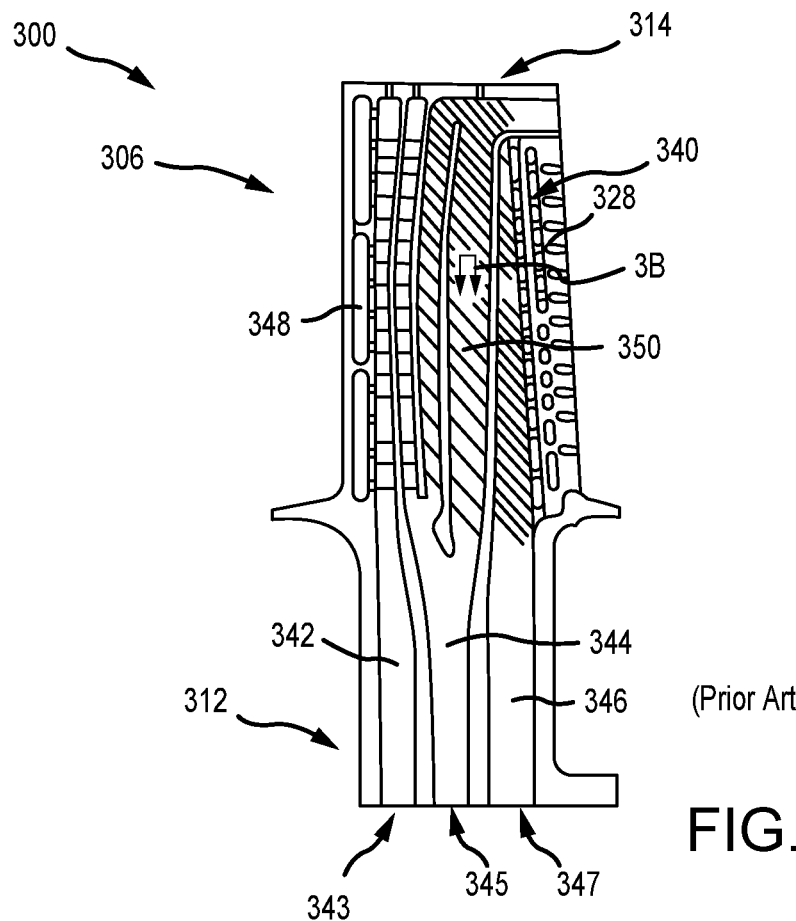
FIGS. 3A and 3B provide spanwise cross sectional and chordwise cross sectional views of an airfoil element subject to periodic servicing, in accordance with various embodiments.
Figure 3B:
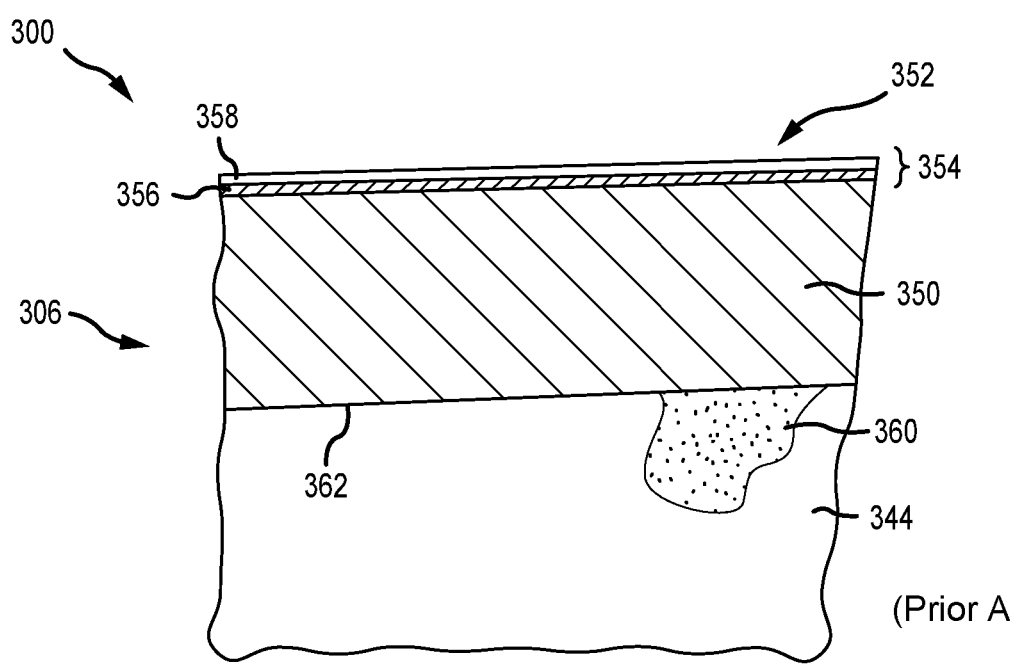

Referring now to FIGS. 3A and 3B, spanwise cross sectional and chordwise cross sectional views, respectively, of an airfoil element 300 (e.g., a rotor blade 306) are illustrated. In various embodiments, the rotor blade 306 includes an internal cooling passage system 340 having multiple trunks or passageways extending from a root section 312 to a blade tip 314. In various embodiments, the internal cooling passage system 340 includes a first passageway 342, a second passageway 344 and a third passageway 346, configured to receive a cooling fluid from respective inlets, such as, for example, a first passageway inlet 343, a second passageway inlet 345 and a third passageway inlet 347. In various embodiments, the internal cooling passage system 340 is configured to expel the cooling fluid through various openings, such as, for example, a plurality of trailing edge outlets 328. Depending upon blade configuration, the trunks or passageways may branch in multiple spanwise cavities, optionally with turns such that a cavity leg with tipward flow is termed an up-pass and a cavity leg with rootward flow is termed a down-pass. Additionally, there may be one or more impingement cavities, such as, for example, a leading edge impingement cavity 348, fed by impingement holes from one of the up-pass or down-pass cavities and discharging via associated outlets to the airfoil exterior surface.

Referring now to FIG. 3B, the chordwise cross sectional view indicated in FIG. 3A is illustrated. More specifically, FIG. 3B provides a cross sectional view of a side surface (e.g., a suction side surface or a pressure side surface) of the rotor blade 306, extending from the side surface into a portion of the second passageway 344. In various embodiments, the rotor blade 306 comprises a substrate 350, which may be metallic. Overlaying the substrate 350, the rotor blade 306 may further comprise one or more coatings 352, which, in various embodiments, may include a thermal barrier coating system 354 and an abrasive coating system (not shown). Each of these coating systems may, in turn, include one or more layers. For example, the thermal barrier coating system 354 may include a metallic bondcoat 356 disposed atop the substrate 350 and a ceramic thermal barrier coating layer 358 atop the metallic bondcoat 356. Similarly, the abrasive coating system may include a metallic underlayer (base layer) and an abrasive layer. In various embodiments, the abrasive layer comprises a matrix and abrasive particles at least partially embedded in the matrix.

As noted above, during service, the substrate 350 and the one or more coatings 352 of the airfoil element 300 can experience wear during use. Further, the various passageways that comprise the internal cooling passage system 340, such as, for example, the second passageway 344, may experience an accumulation of material or debris. Such accumulated material or debris is illustrated in FIG. 3B as a material accumulation 360 that, over time, has accumulated upon the surface of an internal wall 362 of the substrate 350. As described below, various methods and apparatus contemplated by this disclosure may be employed to dislodge the material accumulation 360 or other such obstructions, clogs or blockages occurring within the internal cooling passage system 340.

Figure 4A:
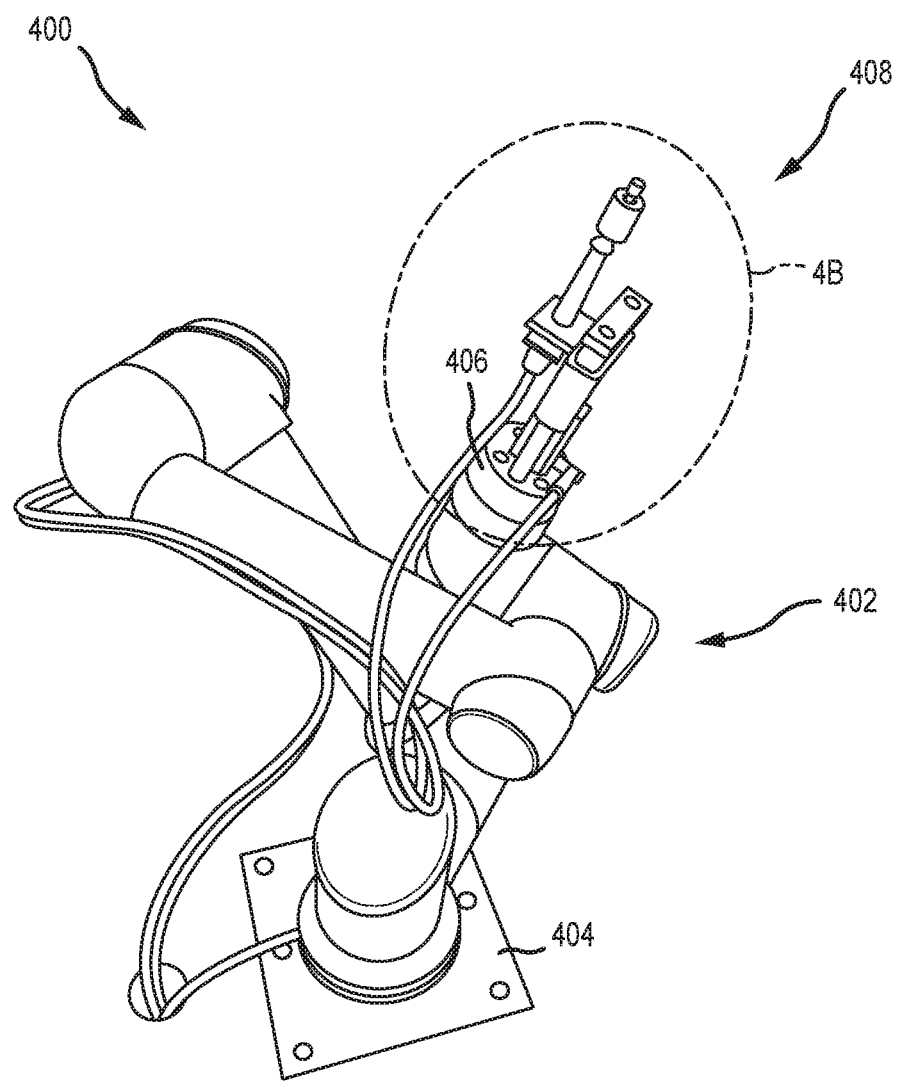
FIGS. 4A and 4B are perspective views of a robotic apparatus configured to provide periodic servicing of an airfoil element, in accordance with various embodiments.
Figure 4B:
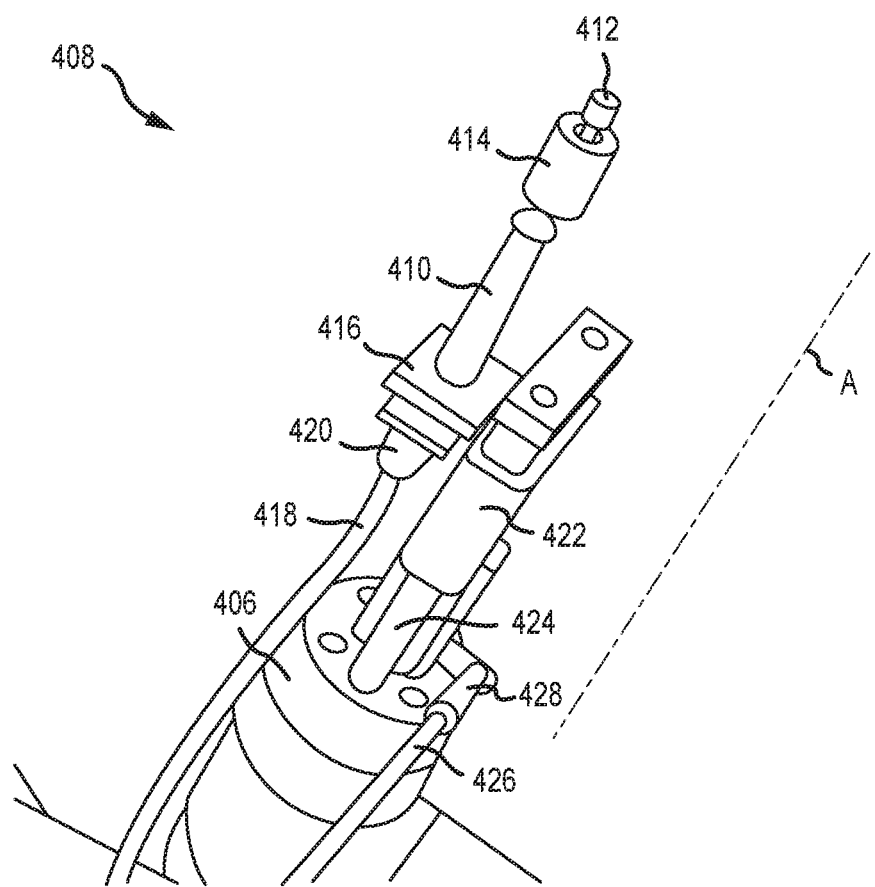

Referring now to FIGS. 4A and 4B, an apparatus 400 for dislodging accumulated material or debris is illustrated. In various embodiments, the apparatus 400 includes a robotic arm 402 with multi-axis capabilities, such as, for example, the UR5 robotic arm available from Universal Robots A/S, located in Odense, Denmark. The UR5, for example, provides a robotic arm 402, which can be programmed to move a tool with respect to a workpiece across a desired trajectory, such as, for example, a side surface of an airfoil element. The tool may be translated and rotated within a workspace by the UR5, leading generally to five axes of movement for the tool, including three translational axes of movement and two rotational axes of movement. The robotic arm 402 includes a base 404 configured for mounting to a stable surface. The robotic arm 402 further includes a mounting head 406 configured to receive for mounting thereon a vibration mechanism 408 (see also FIG. 4B). As described further below, the vibration mechanism 408 is configured to dislodge accumulated material resulting in obstructions, clogs or blockages within an internal cooling passage system of an airfoil element, such as, for example, the internal cooling passage system 340 of the rotor blade 306 described above with reference to FIGS. 3A and 3B.

Referring now to FIG. 4B, with continued reference to FIG. 4A, the vibration mechanism 408 includes a vibrating element 410, a tip member 412 and a coupler 414, configured to couple the tip member 412 to the vibrating element 410. As described further below, the tip member 412 may be configured for vibratory contact with a surface of an airfoil element (or some other component) and to act as a mask or intervening element between the vibrating member and the surface or the airfoil or other component. As illustrated in FIG. 4B, the vibrating element 410 is mounted to a plate 416. A first pneumatic supply line 418 has a vibrating element supply end 420 connected to the vibrating element 410 and configured to provide a supply of pressurized air via the first pneumatic supply line 418 to operate the vibrating element 410. While the vibrating element 410 is described as being operable by a pneumatic supply line, the disclosure contemplates use of vibrating elements operable through other sources of power, such as, for example, electrical power. In various embodiments, the vibrating element 410 may comprise an air scribe or air hammer, such as, for example, the CP 9361 Air Scribe, available from Chicago Pneumatic Tools (www.cp.com). The CP 9361 Air Scribe is capable of pulsing a tip element in a forward and reverse direction respective to a longitudinal axis of the tool to provide a hammer-like pulsation at a specified frequency. In various embodiments, the vibration mechanism 408 (or the vibration element 410) is configured to vibrate the tip member 412 in a range of about one-thousand (1,000) cycles per minute (cpm) (16.66 Hz) to about twenty-thousand (20,000) cpm (333.33 Hz); or in a range of about ten-thousand (10,000) cpm (166.66 Hz) to about fifteen-thousand (15,000) cpm (250 Hz); or at about thirteen-thousand five-hundred (13,500) cpm (225 Hz).

Referring still to FIG. 4B, the vibrating element 410 is connected via the plate 416 to a bias mechanism, such as, for example, a pneumatic cylinder 422, configured to maintain a constant or near-constant pressure of the tip member 412 against a workpiece, such as, for example, an airfoil element. In various embodiments, the pneumatic cylinder 422 is configured to translate along one or more rods 424 that are themselves connected to the mounting head 406. In this manner, the pneumatic cylinder 422 is able to translate the tip member 412, forward and reverse, in an axial direction A with respect to the mounting head 406 in order to maintain a constant or near-constant pressure of the tip member 412 against the airfoil element. Further, the pneumatic cylinder 422, as configured, enables the tip member 412 to closely follow or track the skewed surface of the workpiece or the airfoil element and any distortions or curvature that defines the surface while maintaining substantial contact with the surface. In various embodiments, the pneumatic cylinder 422 is powered using a reverse pressure configuration, whereby a second pneumatic supply line 426 has a pneumatic cylinder supply end 428 connected to the pneumatic cylinder 422 and configured to provide a reverse pressure (e.g., a sub-atmospheric or low pressure or a vacuum or near-vacuum) to the pneumatic cylinder 422. The reverse pressure configuration of the pneumatic cylinder 422 more readily enables a constant or near-constant pressure to be applied at the tip member 412 against the airfoil element than a positive pressure device is able to apply. In various embodiments, the bias mechanism, broadly, may comprise a coil spring or similar mechanical device or an electromechanical device (e.g., an electro magnet) configured to maintain the constant or near-constant pressure of the tip member 412 against the workpiece, such as, for example, the airfoil element.

Figure 5A:
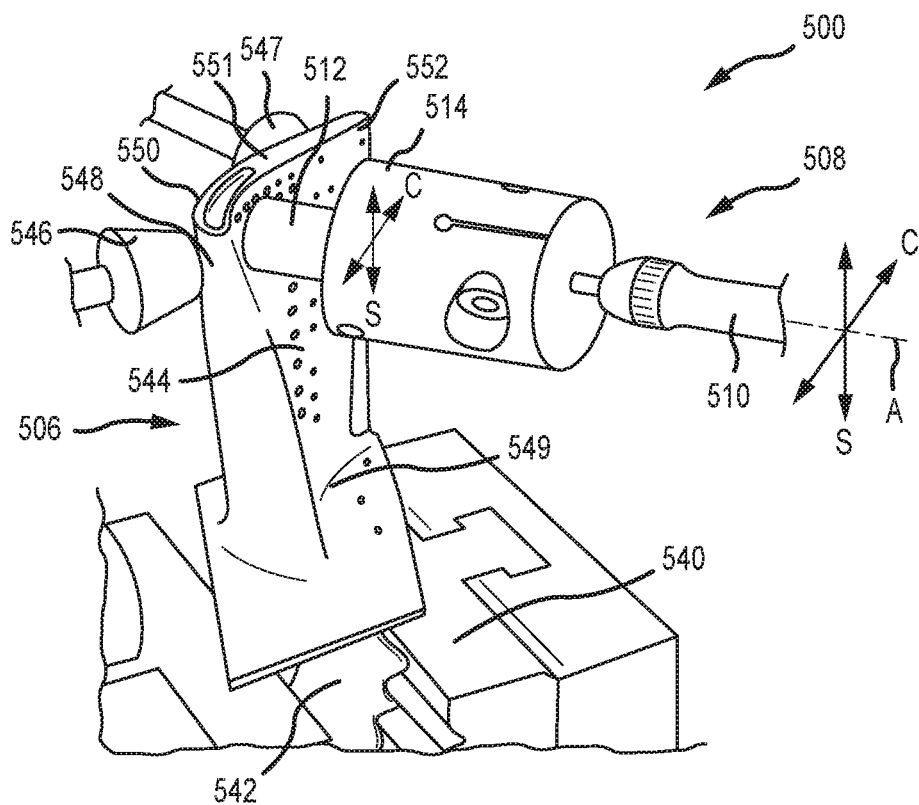
FIGS. 5A and 5B are close up views of a robotic apparatus configured to provide periodic servicing of an airfoil element, in accordance with various embodiments.
Figure 5B:
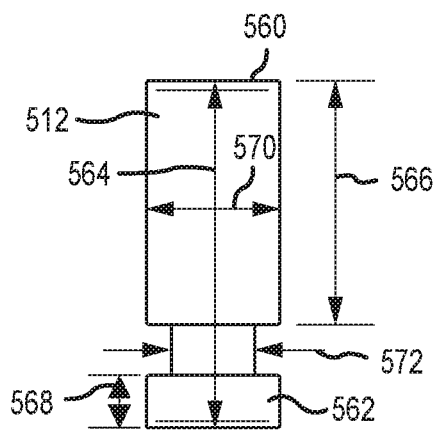

Referring now to FIGS. 5A and 5B, a close up view of an apparatus 500 for dislodging accumulated material or debris in an airfoil element, such as, for example, a rotor blade 506, is illustrated. Similar to the foregoing description, the apparatus 500 includes a vibration mechanism 508 having a vibrating element 510, a tip member 512 and a coupler 514, configured to couple the tip member 512 to the vibrating element 510. In various embodiments, the apparatus 500 includes a vice 540 configured to securely hold the rotor blade 506 in place against the pressure applied to a side surface of the rotor blade 506 by the tip member 512. As illustrated, for example, the vice 540 may be configured to grasp the rotor blade 506 by a root section 542 of the rotor blade 506. As further illustrated, the tip member 512 is configured for vibratory contact with a pressure side surface 544 of the rotor blade 506. A first backstop member 546 is configured to support a leading edge portion 548 of the rotor blade 506 on a suction side surface 550 and a second backstop member 547 is configured to support a trailing edge portion 552 of the rotor blade 506 on the suction side surface 550. In various embodiments, one or both of the first backstop member 546 and the second backstop member 547 may be used to avoid, reduce or to minimize any fluttering of the rotor blade 506 (or other workpiece) that may occur, for example, due to resonant vibrations that may be set up within the rotor blade 506 during operation. As discussed further below, during operation, the tip member 512 is configured to translate in a spanwise direction, S, between a base portion 549 and a blade tip 551, and in a chordwise direction, C, between the leading edge portion 548 and the trailing edge portion 552, while applying a vibratory motion against the rotor blade 506.

Referring to FIG. 5B, the tip member 512 of the apparatus 500 is illustrated in cross section. In various embodiments, the tip member 512 is comprised of a plastic or thermoplastic material, such as, for example, an acetal or polyacetal material exhibiting high stiffness, low friction and favorable stability properties. In various embodiments, the material used to construct the tip member 512 is an acetal resin available from DuPont under the tradename Delrin®. In various embodiments, the tip member 512 includes a contact portion 560 configured for contacting the rotor blade 506 and a chuck portion 562 configured for being positioned and maintained within the coupler 514. In various embodiments, the tip member 512 may be defined by an overall length 564, a body length 566 and a base length 568 and a body diameter 570 and a transition diameter 572. In various embodiments, the tip member 512 is configured to impart vibratory motion against the surface side (either pressure or suction) of the rotor blade 506 within the ranges set forth previously and, in various embodiments, at about thirteen-thousand five-hundred (13,500) cpm (225 Hz). Operating within the previously set forth range of frequencies, in various embodiments, the overall length is about 0.788 inches (20.0 mm), the body length 566 is about 0.504 inches (12.8 mm), the base length 568 is about 0.14 inches (3.5 mm), the body diameter 570 is about 0.315 inches (8.0 mm) and the transition diameter 572 is about 0.214 inches (5.4 mm). In various embodiments, each of the foregoing dimensions is within a range of about ±10-20% of the specified value.

Figure 6:
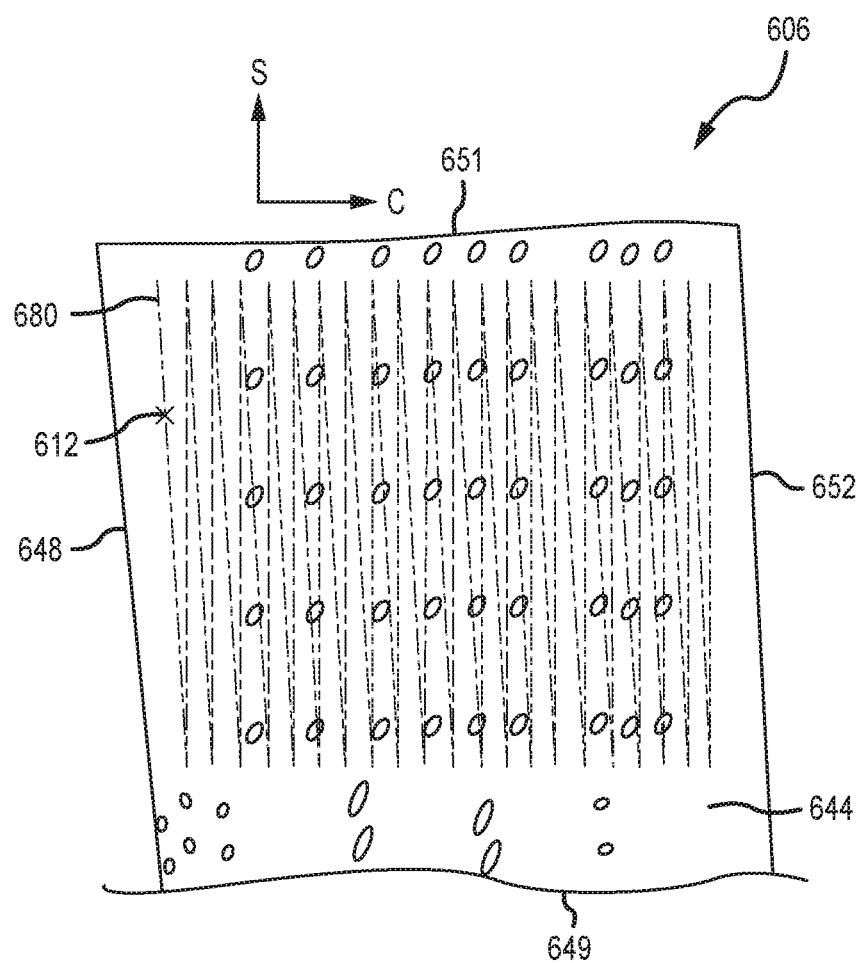
FIG. 6 is a time versus position plot of a head element of a robotic apparatus configured to provide periodic servicing of an airfoil element overlaid upon an airfoil element undergoing periodic servicing, in accordance with various embodiments.

Referring now to FIG. 6, a time versus position plot 680 of a tip member 612 overlaid upon a side surface 644 of a rotor blade 606 is illustrated while the rotor blade 606 undergoes periodic servicing using the apparatus described in the disclosure, such as, for example, the apparatus 500 described above with reference to FIGS. 5A and 5B. In various embodiments, the rotor blade 606 includes a leading edge 648 and a trailing edge 652 and a base portion 649 and a blade tip 651. In various embodiments, the apparatus is programmed to move the tip member 612 in a chordwise direction, C, from proximate the leading edge 648 to proximate the trailing edge 652, and to move the tip member 612 in a spanwise direction, S, from proximate the base portion 649 to proximate the blade tip 651. In various embodiments, the tip member 612 is configured by the apparatus to traverse the side surface 644 from proximate the blade tip 651 to proximate the base portion 649 and back to proximate the blade tip 651 in approximately one (1) second intervals. In various embodiments, the tip member 612 is also configured by the apparatus to traverse the side surface 644 from proximate the leading edge 648 to the trailing edge 652 in approximately twenty (20) seconds. The foregoing configuration, as illustrated in FIG. 6, thus contemplates a sine wave shaped traversal, having approximately twenty (20) periods, that sweeps the tip member 612 over the side surface 644, substantially in its entirety, in approximately twenty (20) seconds. In various embodiments, the tip member 612 is configured to impart vibratory motion against the surface side 644 of the rotor blade 606 within the ranges set forth previously and, in various embodiments, at about thirteen-thousand five-hundred (13,500) cpm (225 Hz), during the above described interval of approximately twenty (20) seconds.

Figure 7:
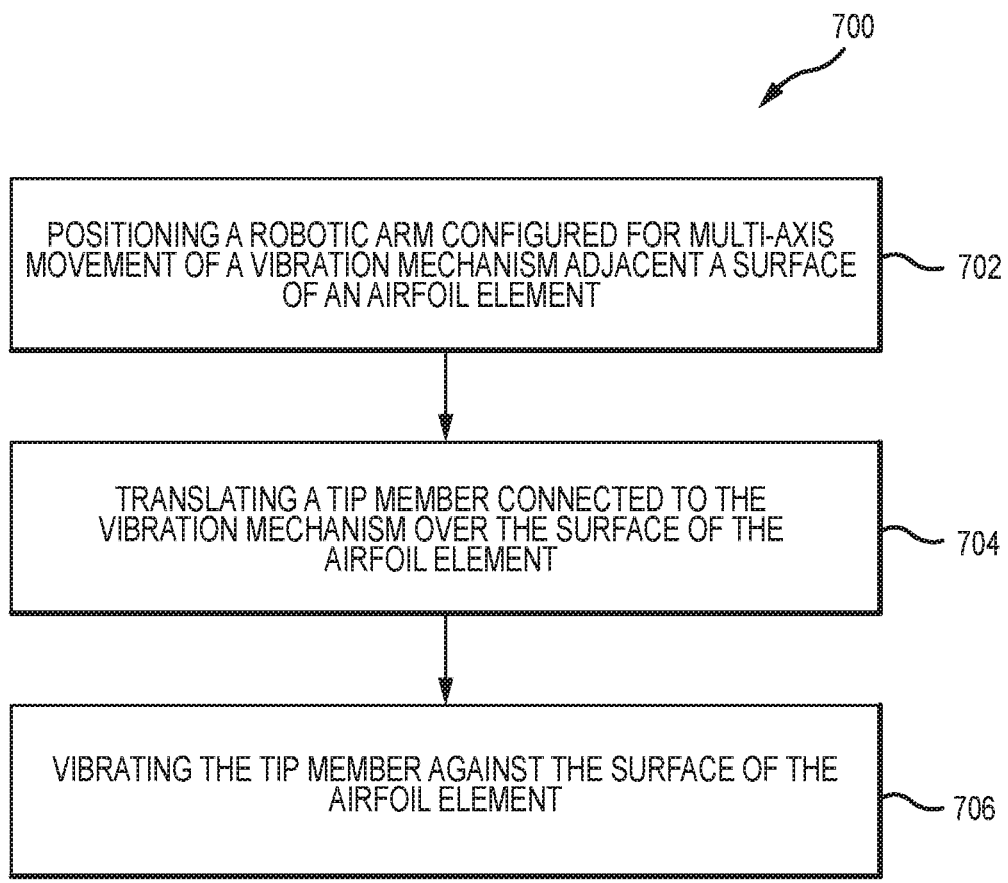
FIG. 7 illustrates a method for dislodging material within an internal cooling passage system of an airfoil element, in accordance with various embodiments.

Referring now to FIG. 7, a method 700 for dislodging material within an internal cooling passage system of an airfoil element is described. In various embodiments, a first step 702 of the method includes positioning a robotic arm configured for multi-axis movement of a vibration mechanism adjacent a surface of an airfoil element. A second step 704 of the method includes translating a tip member connected to the vibration mechanism over the surface of the airfoil element. In a third step 706, the method includes vibrating the tip member against the surface of the airfoil element at the same time the tip member is being translated over the surface of the airfoil element. In various embodiments, the step of translating the tip member connected to the vibration mechanism over the surface of the airfoil element comprises moving the tip member in a spanwise direction and in a chordwise direction over the surface of the airfoil element. In various embodiments, the step of vibrating the tip member against the surface of the airfoil element comprises vibrating the tip member within a range of about one-thousand (1,000) cycles per minute (cpm) (16.66 Hz) to about twenty-thousand (20,000) cpm (333.33 Hz); or within a range of about ten-thousand (10,000) cpm (166.66 Hz) to about fifteen-thousand (15,000) cpm (250 Hz); or at about thirteen-thousand five-hundred (13,500) cpm (225 Hz).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An apparatus for dislodging material within an airfoil element, comprising:
    a mounting head;
    a robotic arm configured for multi-axis movement of the mounting head with respect to the airfoil element;
    a vibration mechanism connected to the mounting head;
    a tip member connected to the vibration mechanism and configured for vibratory contact with a surface of the airfoil element;
    a pneumatic cylinder connected to the mounting head and configured to maintain the tip member in direct contact against the surface of the airfoil element under a reverse pressure; and a sub-atmospheric pressure source configured to provide the reverse pressure to the pneumatic cylinder,
wherein the pneumatic cylinder includes a rod connected to the mounting head and
wherein the pneumatic cylinder is configured to translate the tip member in an axial direction with respect to the rod and toward the surface of the airfoil.

2. The apparatus of claim 1, wherein the vibration mechanism is an air scribe or an air hammer.

3. The apparatus of claim 2, wherein the vibration mechanism is configured to vibrate the tip member within a range of about ten-thousand cycles per minute to about fifteen-thousand cycles per minute.

4. The apparatus of claim 3, wherein the tip member is connected to the vibration mechanism by a coupler.

5. The apparatus of claim 1, further comprising a vice configured to grasp the airfoil element.

6. The apparatus of claim 5, further comprising a backstop member configured to support a portion of the airfoil element.

7. The apparatus of claim 1, wherein the robotic arm is configured to translate the tip member against the surface of the airfoil element in a spanwise direction and in a chordwise direction.

8. The apparatus of claim 7, wherein the vibration mechanism is configured to vibrate the tip member in a range of about ten-thousand cycles per minute to about fifteen-thousand cycles per minute.

9. The apparatus of claim 8, wherein the tip member is constructed of a plastic material and includes a contact portion, the contact portion configured for contacting the surface of the airfoil element, and a chuck portion, the chuck portion configured for positioning within a coupler.

10. An apparatus for dislodging material within an internal cooling passage system of a turbine blade, comprising:
a mounting head;
a robotic arm configured for multi-axis movement of the mounting head with respect to the turbine blade;
a vibration mechanism connected to the mounting head; and
a tip member connected to the vibration mechanism and configured for vibratory contact with a surface of the turbine blade;
a pneumatic cylinder connected to the mounting head and configured to maintain the tip member in direct contact against the surface of the turbine blade under a reverse pressure; and
a sub-atmospheric pressure source configured to provide the reverse pressure to the pneumatic cylinder,
wherein the pneumatic cylinder includes a rod connected to the mounting head and
wherein the pneumatic cylinder is configured to translate the tip member in an axial direction with respect to the rod and toward the surface of the turbine blade.

11. The apparatus of claim 10, wherein the vibration mechanism is configured to vibrate the tip member in a range of about ten-thousand cycles per minute to about fifteen-thousand cycles per minute.

* * * * *